United States Patent
Peña et al.

(10) Patent No.: US 7,413,206 B2
(45) Date of Patent: Aug. 19, 2008

(54) EXTRA HAND POWERED BICYCLE

(76) Inventors: Victor Medina Peña, Paseo Literatos #1 A, Fracc, Reforma, Tijuana (MX); Ricardo Medina Peña, Calle Claveles #727, Fracc, Lomas del Matamoros, Tijuana (MX)

( * ) Notice: Subject to any disclaimer, the term of this patent is extended or adjusted under 35 U.S.C. 154(b) by 454 days.

(21) Appl. No.: 11/317,372

(22) Filed: Dec. 21, 2005

(65) Prior Publication Data

US 2007/0152421 A1   Jul. 5, 2007

(51) Int. Cl.
*B62M 1/14* (2006.01)

(52) U.S. Cl. ............... 280/246; 280/244; 280/233; 280/234; 280/247; 280/248; 280/249; 280/250; 280/258

(58) Field of Classification Search ........... 280/244, 280/233, 234, 246–250, 258
See application file for complete search history.

(56) References Cited

U.S. PATENT DOCUMENTS

| | | | | |
|---|---|---|---|---|
| 3,193,305 A * | 7/1965 | Hendricks | ........... | 280/225 |
| 4,548,420 A * | 10/1985 | Patroni, Jr. | ........... | 280/224 |
| 4,685,692 A * | 8/1987 | Fullilove et al. | ........... | 280/234 |
| 4,705,269 A * | 11/1987 | DeBoer et al. | ........... | 482/62 |
| 5,082,302 A * | 1/1992 | Nacar | ........... | 280/234 |
| 5,328,195 A * | 7/1994 | Sommer et al. | ........... | 280/233 |
| 5,431,614 A * | 7/1995 | Jeranson | ........... | 482/57 |
| 5,775,708 A * | 7/1998 | Heath | ........... | 280/234 |
| 5,820,151 A * | 10/1998 | Cheng et al. | ........... | 280/233 |
| 5,833,256 A | 11/1998 | Gilmore | | |
| 5,908,199 A * | 6/1999 | Rigato | ........... | 280/233 |
| 6,099,009 A * | 8/2000 | Schroeder | ........... | 280/234 |
| 6,105,985 A * | 8/2000 | Cosgrave | ........... | 280/248 |
| 6,193,253 B1 * | 2/2001 | Barnett | ........... | 280/234 |
| 6,264,224 B1 * | 7/2001 | Phillips | ........... | 280/234 |

* cited by examiner

*Primary Examiner*—Lesley D. Morris
*Assistant Examiner*—Michael R Stabley
(74) *Attorney, Agent, or Firm*—The Maxham Firm

(57) ABSTRACT

A drive system for use with a bicycle includes first and second gears arranged so that the second gear is rotatably driven responsive to the first gear. A freewheel is operatively coupled to the second gear, and a drive sprocket is operatively coupled to the freewheel. The freewheel causes the drive sprocket to be rotatably driven only when the first gear is driven in either the first direction or the second direction. A driven sprocket may be mounted coaxially and in driving relationship with a wheel of the bicycle. A chain may be used for linking the drive sprocket and the driven sprocket. First and second levers extend from a support bar, which is coaxially mounted to the first gear. Reciprocal movement of the first and second levers causes the first gear to rotate, and correspondingly causes the second gear to rotate, thereby effecting rotation in the drive sprocket and the driven sprocket.

23 Claims, 10 Drawing Sheets

EXTRA HAND POWERED BICYCLE

BACKGROUND OF THE INVENTION

1. Field of the Invention

The present invention relates generally to bicycles, and in particular to a hand powered drive system for a bicycle.

2. Discussion of the Related Art

User-powered vehicles of many types have been developed and are in widespread use throughout the world. Such vehicles enjoy great popularity and have proven extremely useful for general recreation, sports, physical exercise, and utility. Common user-powered vehicles include bicycles and three- or four-wheeled pedaled variations thereof intended for use on land and water.

A benefit offered by conventional bicycles is that such vehicles provide exercise for the rider, improving health and fitness of the populous. A number of designs have been proposed for arm-assisted drive of the conventional foot pedal powered bicycle. Some designs used hand pedals that are mechanically coupled to the foot pedal by tensional lines through pulleys. Other designs utilize rotary hand cranks in addition to a conventional handlebar. Although such vehicles have enjoyed a certain degree of success, bicycles having more efficient and powerful drive systems are needed.

SUMMARY OF THE INVENTION

In accordance with an embodiment, a drive system for use with a bicycle includes a first gear structured to be rotatably driven in opposing first and second directions. The drive system also includes a second gear structured to be rotatably driven responsive to the first gear, and in a direction that is opposite to a direction that the first gear rotates. A freewheel is operatively coupled to the second gear, and a drive sprocket is operatively coupled to the freewheel. The freewheel causes the drive sprocket to be rotatably driven only when the first gear is driven in either the first direction or the second direction. A driven sprocket may be mounted coaxially and in driving relationship with a wheel of the bicycle. A chain may be used for linking the drive sprocket and the driven sprocket. First and second levers extend from a support bar, which is coaxially mounted to the first gear. Reciprocal movement of the first and second levers causes the first gear to rotate, and correspondingly causes the second gear to rotate, thereby effecting rotation in the drive sprocket and the driven sprocket.

BRIEF DESCRIPTION OF THE DRAWING

The above and other aspects, features, and advantages of the present invention will become more apparent upon consideration of the following description of preferred embodiments, taken in conjunction with the accompanying drawing figures, wherein.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, as well as procedural, changes may be made without departing from the scope of the present invention. As a matter of convenience, various components of a drive system and brake assembly will be described using exemplary materials, sizes, shapes, and dimensions. However, the present invention is not limited to the stated examples and other configurations are possible and within the teachings of the present disclosure. Various embodiments will be described in conjunction with a bicycle, but the present invention is not so limited and such teachings apply equally to other wheeled conveyances including cycles having three, four, or more wheels, or to water propelled conveyances that supply rotating vanes, paddles, or propellers in the water.

Various directional terms are used herein, including left, right, up, down, upward, downward, front, rear, forward, rearward, and the like. For clarity, these directional terms are based on the frame of reference of a human rider and presumes a direction of travel of a bicycle in the direction that the rider faces. "Down" and "downward" mean generally toward the surface on which the bicycle travels and "up" and "upward" mean generally away from the surface on which the bicycle travels. "Forward" and "front" mean generally the direction in which the rider faces and "rearward" and "rear" are generally the opposite thereof. Also, "turning the bicycle" means changing the direction of travel of the bicycle to the right or left.

Figure 1:
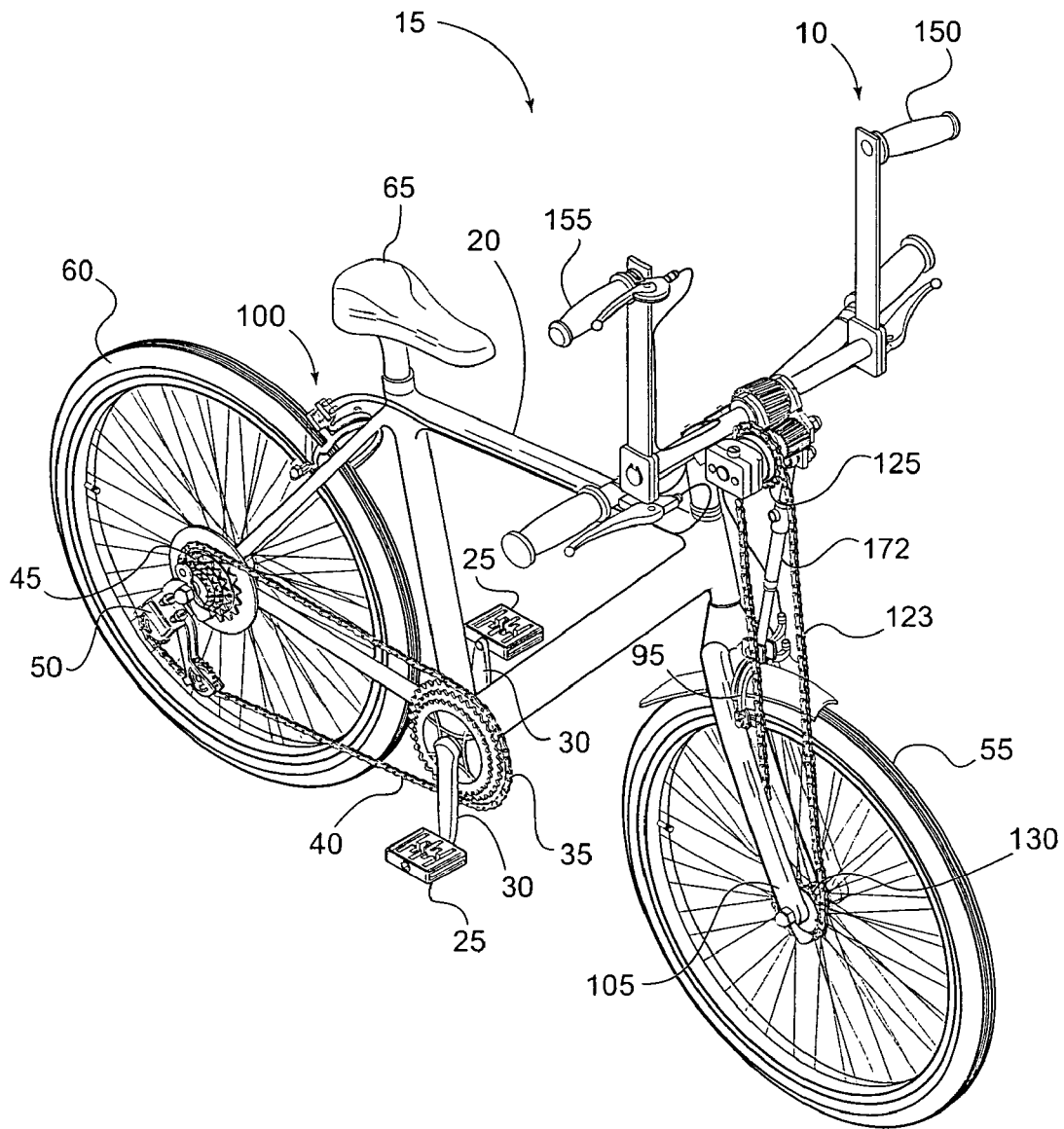
FIG. 1 is a perspective view of a drive system implemented on a bicycle in accordance with an embodiment of the present invention.
Figure 2:
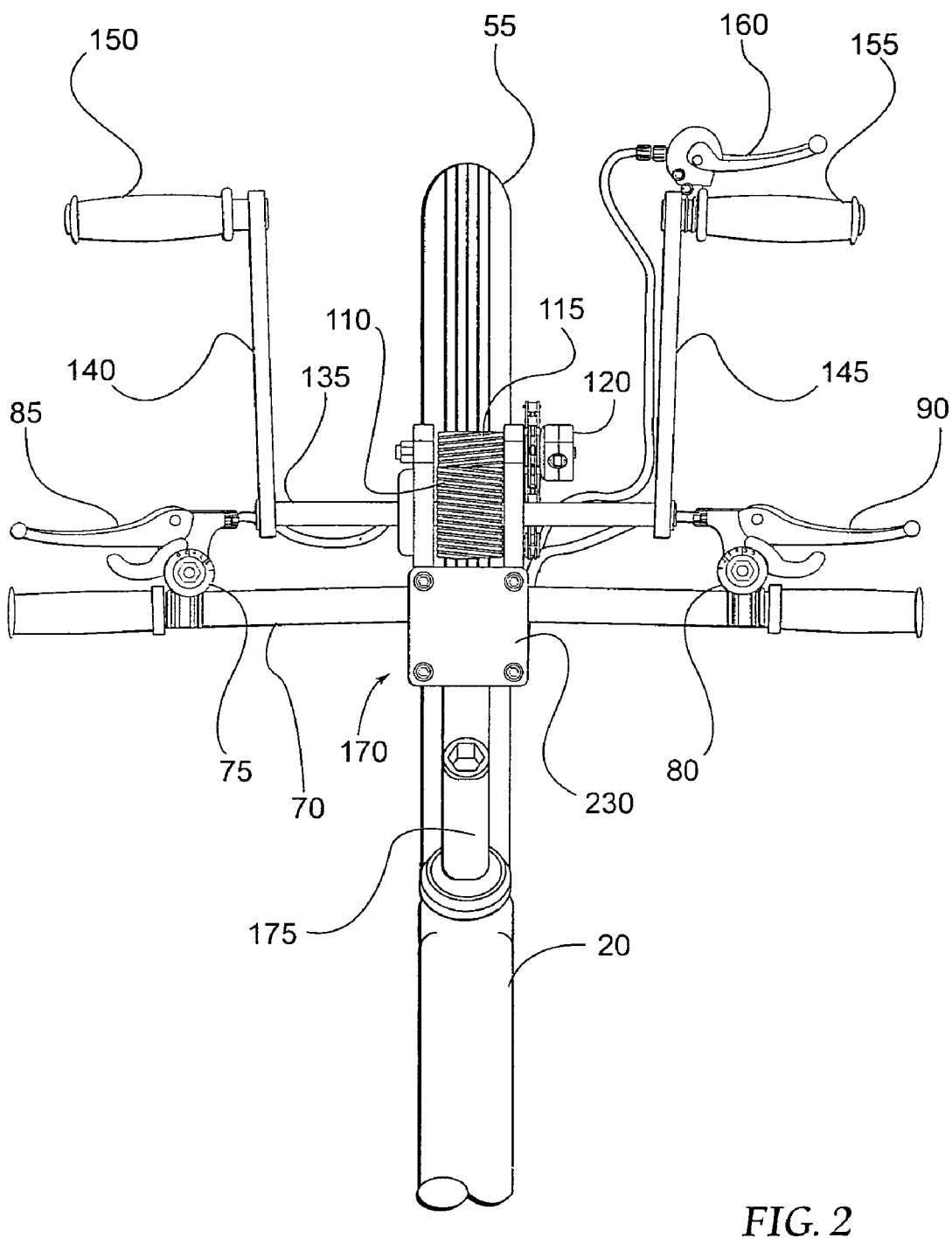
FIG. 2 is a top view the drive system of FIG. 1.

In accordance with an embodiment of the present invention, FIGS. 1 and 2 are perspective and top views, respectively, of drive system 10 implemented with bicycle 15. Bicycle 15 includes various conventional features such as frame 20, which supports a rear wheel drive mechanism having pedals 25, associated crank rods 30, and front drive sprocket 35. The rear wheel drive mechanism may utilize chain 40 to link the front drive sprocket with rear wheel sprocket 45 and associated transmission linkage 50. Bicycle 15 further includes front and rear wheels 55, 60, and seat 65 for supporting a rider.

As shown in FIG. 2, handlebar 70 includes gear selectors 75, 80, which permit changing of the bicycle's gears. The handlebar also includes front and rear brake levers 85, 90, which may be used to control front and rear brakes 95 and 100, respectively. Front wheel 55 is rotationally secured to fork 105, which may be pivotally controlled by handlebar 70 and/or by user manipulation of drive system 10.

Drive system 10 includes first gear 110, second gear 115, and adapter 120. First gear 110 may be formed with suitable grooves that cooperate with grooves formed in second gear 115. Chain 123, or other suitable linking device such as a belt, a strap, a cable, and the like, may be used to link a drive sprocket (not shown in this figure), which is associated with the adapter, and driven sprocket 130. The driven sprocket is shown mounted coaxially and in driving relationship with front wheel 55. The drive sprocket and the driven sprocket are more clearly shown in later figures.

Drive system 10 may also include support bar 135 and associated levers 140, 145, which extend from distal ends of the support bar. If desired, handgrips 150, 155, may be affixed to distal ends of the levers. An optional brake lever 160 may be proximately located relative to handgrip 155, for example. The positioning of the brake lever is not critical, as long as such location permits user manipulation to activate an associated wheel brake (for example, rear brake assembly 100). Drive system 10 may be secured to handlebar 70 using mounting bracket 170 and optional mounting bar 172. Handlebar 70 is shown rotatably secured to frame 20 via stem 175.

Figure 3:
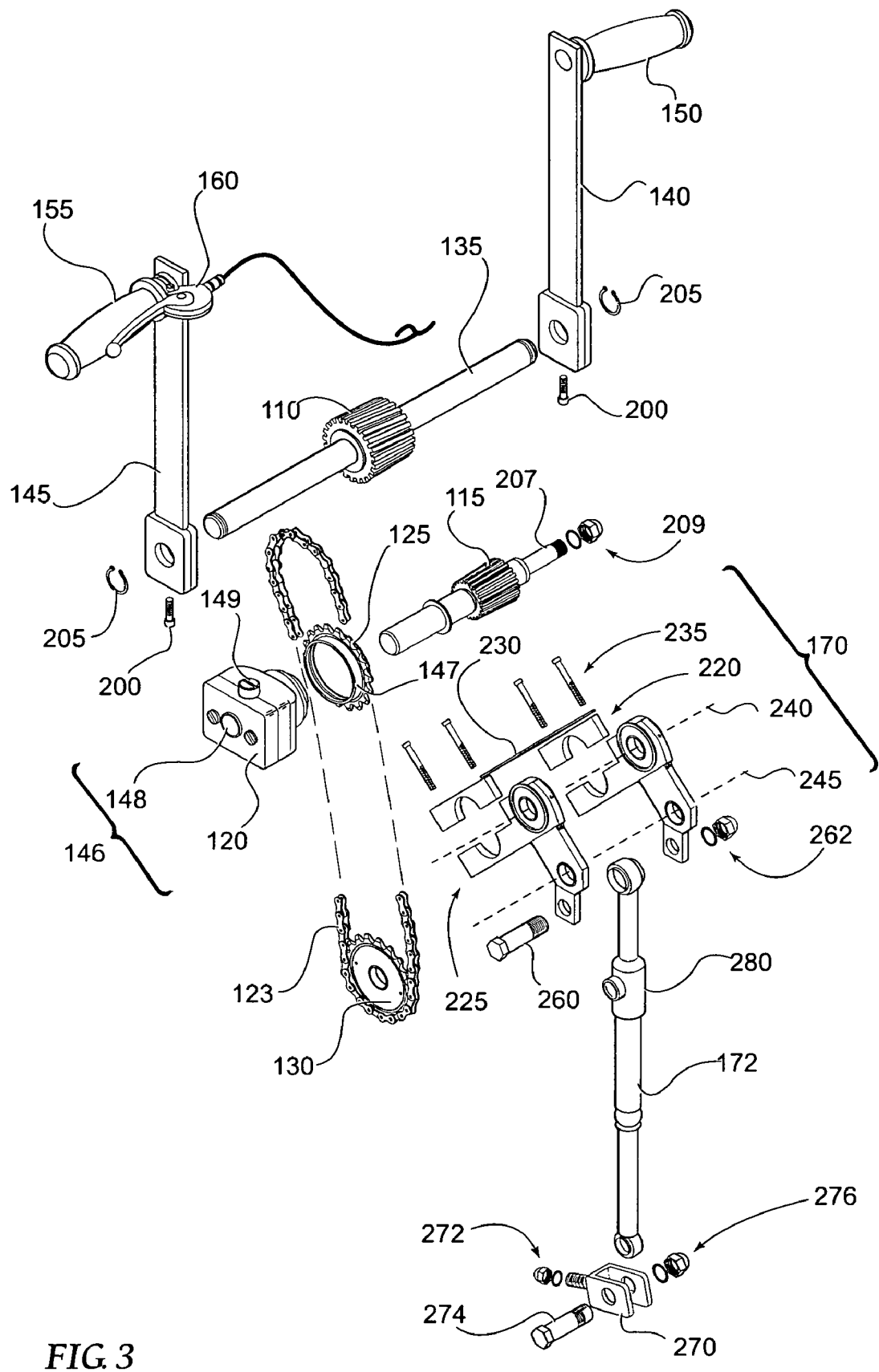
FIG. 3 is an exploded view of the drive system of FIG. 1.

FIG. 3 is an exploded view showing various components of drive system 10. In this figure, support bar 135 is shown coaxially mounted with first gear 110. First and second levers 140 and 145 may each be attached to the support bar using suitable fasteners, such as bolts 200 and clips 205. Rod 207 is shown coaxially mounted with second gear 115.

Transmission assembly 146 includes adapter 120, freewheel 147, and drive sprocket 125. The freewheel and associated drive sprocket may be operatively coupled in known fashion. The adapter is shown threadably receiving the freewheel. One end of rod 207 may be received within aperture 148 of the adapter, and the other end of bar 207 is shown received by cap and washer 209. Rod 207 may be operatively coupled to adapter 120 using known techniques and components that are capable of maintaining these components in a fixed spatial relationship including, for example, welding, a screw, a cotter pin, frictional fitting, and the like. The example of FIG. 3 depicts the use of screw 149 to provide the desired coupling of these components.

Mounting bracket 170 may be secured to handlebar 70 using, for example, upper housing 220 and lower housing 225, plate 230, and bolts 235. Apertures 240 rotatably receive support bar 135, and apertures 245 rotatably receive rod 207.

Optional mounting bar 172 may be affixed to mounting bracket 170 using, for example, threaded bolt 260 and cooperating cap and washer 262. At a lower end, mounting bar 172 may be operatively coupled to the fork of the bicycle (not shown in this figure) using a suitable device such as bracket 270 and cooperating cap and washer 272, bolt 274, and cap and washer 276.

If desired, mounting bar 172 may be configured with adjustment device 280. The adjustment device permits adjustment of the length of mounting bar 172. The adjustment device allows for the drive system to be installed on bicycles of varying types and sizes. Adjustment of the length of mounting bar 172 also permits height adjustments to handlebar 70 and/or for the adjustment (i.e., tightening or loosening) of chain 123.

Figure 4A:
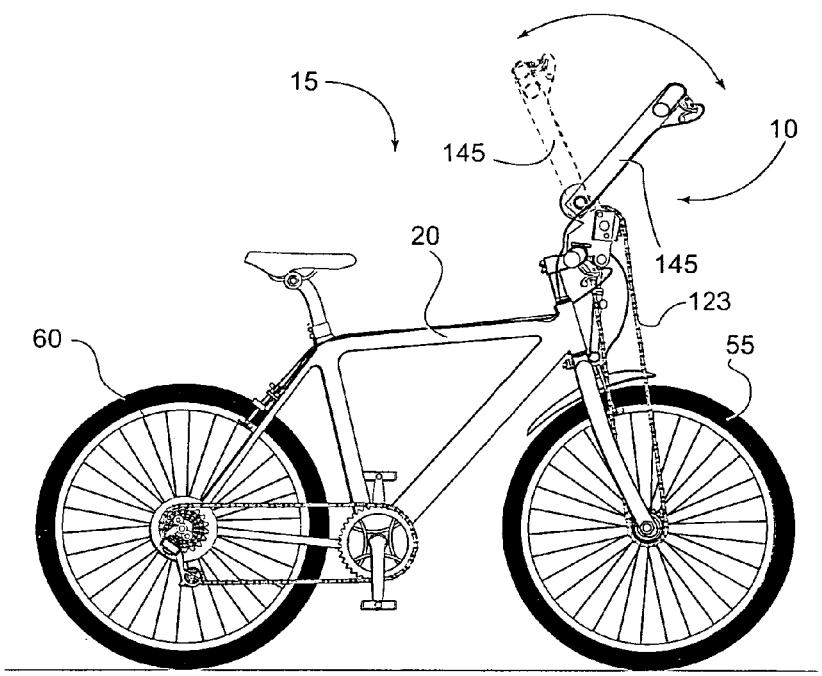
FIG. 4A is a side view of the bicycle and drive system of FIG. 1, showing the drive system operated using reciprocal rearward-forward motion.
Figure 4B:
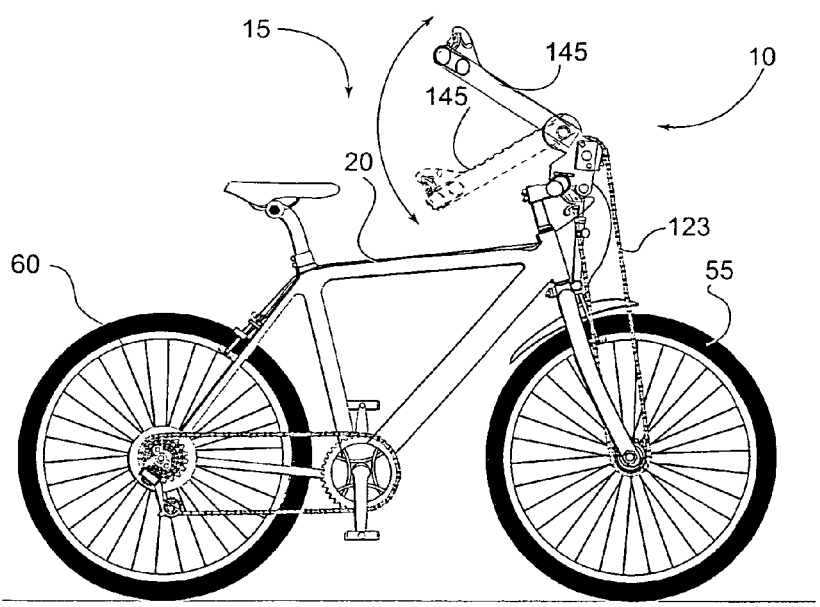
FIG. 4B is a side view of the bicycle and drive system of FIG. 1, showing the drive system operated using reciprocal upward-downward motion.

FIGS. 4A and 4B are side views of bike 15, each illustrating a different technique for operating drive system 10. In FIG. 4A, the drive system is shown operating using reciprocal rearward-forward motion. In contrast, FIG. 4B depicts the drive system operating using reciprocal upward-downward motion. By way of non-limiting example, operation of drive system 10 in conjunction with bicycle 15 may proceed as follows.

In general, operation of drive system 10 includes a driving phase and a preparatory phase. A driving phase is one in which a user manipulates handgrips 150, 155, for example, in such a manner that ultimately imparts a rotational force on driven sprocket 130, thus causing front wheel 55 to move in a desired direction (for example, forward). The driving phase may be accomplished by the user pulling the handgrips rearward (FIG. 4A), or pushing the handgrips downward (FIG. 4B), or some combination thereof. In contrast, a preparatory phase is one in which freewheel 147 of the transmission assembly does not allow rotational forces provided by the first and second gears to impart a rotational force on drive sprocket 125. Consequently, chain 123 does not then impart a driving force on driven sprocket 130. The preparatory phase may occur when the user pushes the handgrips forward (FIG. 4A), or pulls the handgrips upward (FIG. 4B), or some combination thereof.

Figure 5:
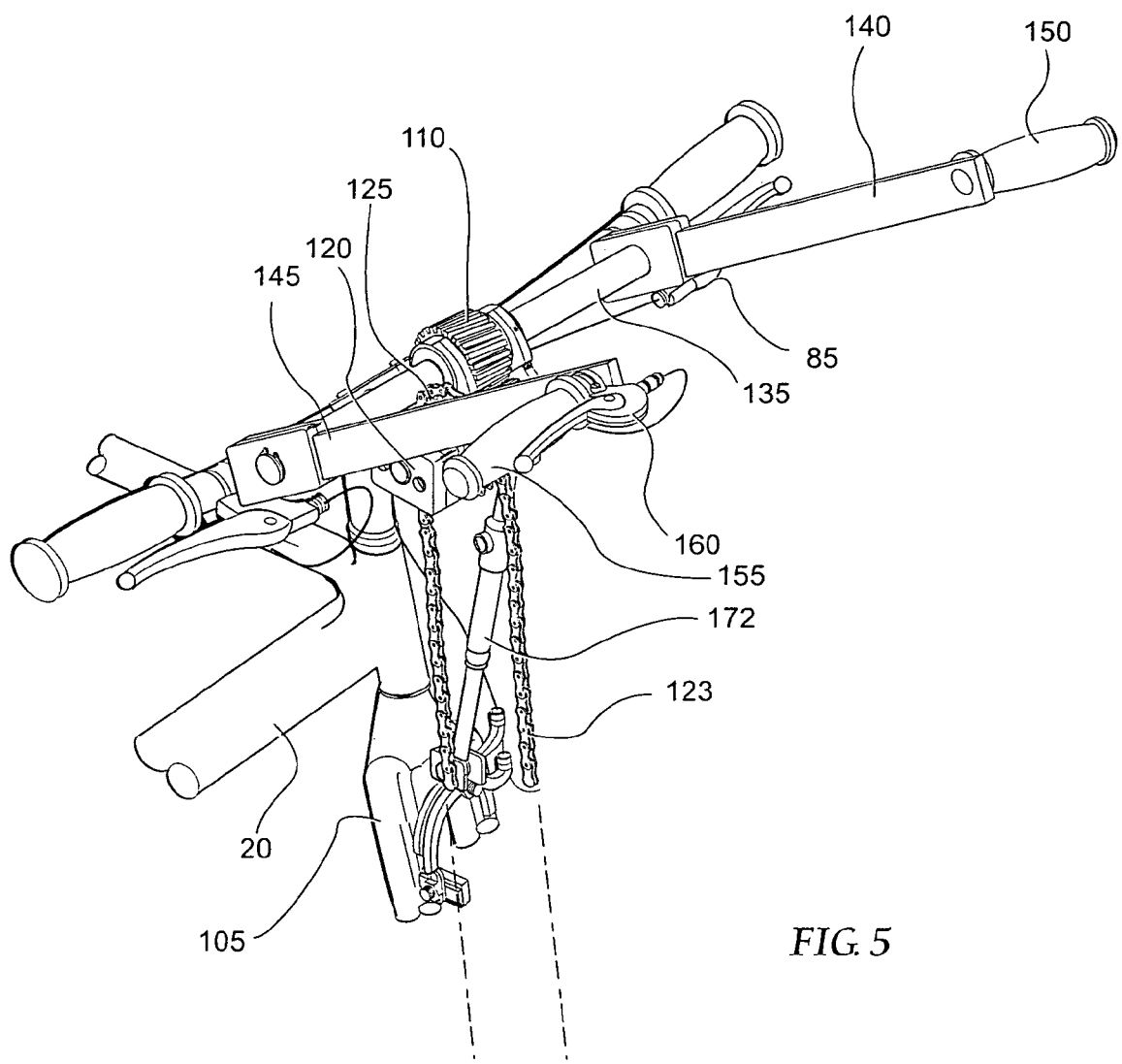
FIG. 5 is a more detailed view of the drive system of FIG. 4A in the forward position.
Figure 6:
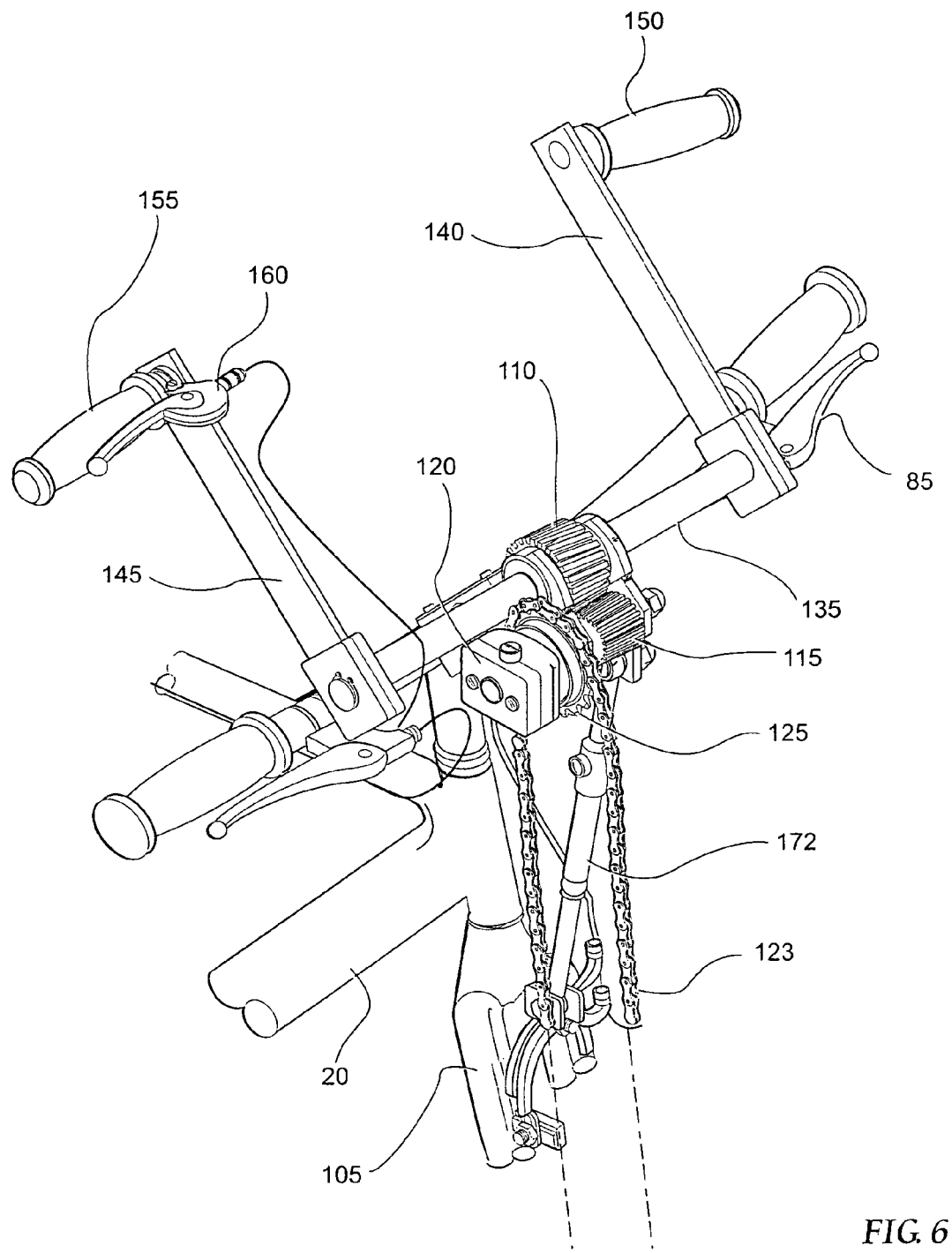
FIG. 6 is a more detailed view of the drive system of FIG. 4A in the rearward position.

Referring specifically to FIGS. 4A, 5, and 6, a rider may initially grasp handgrips 150,155 to begin operation of drive system 10. At this point, lever 145 is in the forward position, as indicated by the solid line depiction of this component in FIG. 4A. FIG. 5 is a more detailed view of drive system 10 in the forward position.

In the driving phase, the rider may pull the handgrips rearward, causing support bar 135 and associated first gear 110 to rotate counter-clockwise, ultimately positioning lever 145 in the rearward position, as indicated by the broken line depiction of this component. At the same time, second gear 115 is rotatably driven in a clockwise direction responsive to the rotation of the first gear. During this rearward pulling motion, the various components of transmission assembly 146 cause drive sprocket 125 to rotate responsive to the rotation of the second gear. Rotating drive sprocket 125 utilizes chain 123 to impart a corresponding rotation in driven sprocket 130, thus causing a rotational force to be applied to wheel 55. FIG. 6 is a more detailed view of drive system 10 in the rearward position.

After the driving phase, the rider may then push the handgrips forward in a preparatory phase to ready the drive system for the next driving phase. Note that pushing the handgrips forward causes first gear 110 to rotate clockwise and second gear 115 to rotate counter clockwise. However, in this phase, freewheel 147 is disengaged with drive sprocket 125 such that the forward movement of the handgrips does not impart rotational forces on drive sprocket 125. Consequently, no rotational force is applied to driven sprocket 130 during this preparatory phase. A rider may repeatedly perform the driving and preparatory phases by repeatedly pulling and then pushing handgrips 150,155. Such reciprocal motion applies a driving force to wheel 55, which may be used to supplement or replace user peddling.

Figure 7:
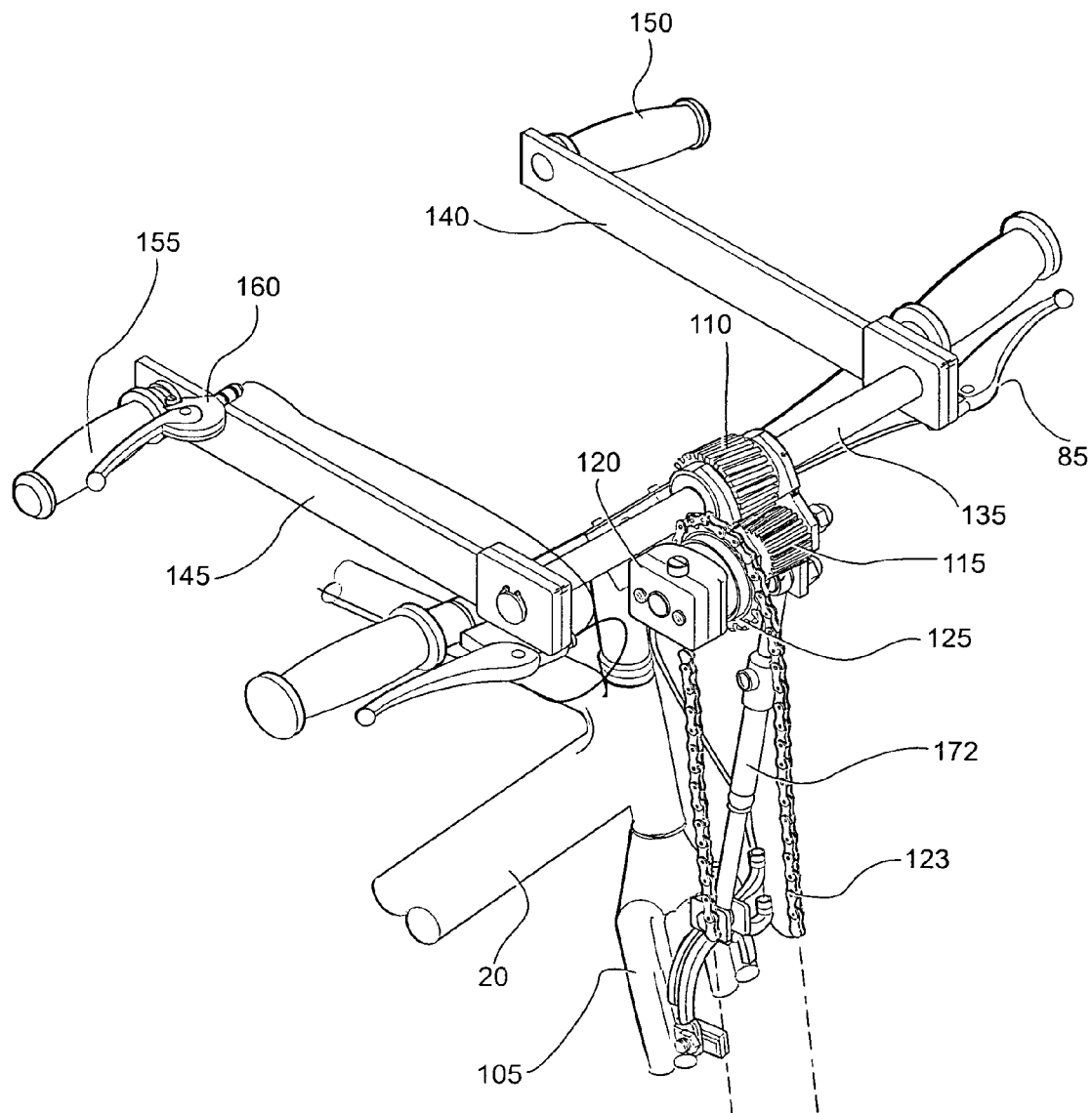
FIG. 7 is a more detailed view of the drive system of FIG. 4B in the upward position.

An alternative technique for operating drive system 10 is illustrated in FIG. 4B. This technique utilizes reciprocal upward-downward motion to operate the drive system. For instance, a rider may initially grasp handgrips 150,155 while lever 145 is positioned in the upward position, as depicted in the solid line illustration of lever 145. FIG. 7 is a more detailed view of drive system 10 in the upward position.

Figure 8:
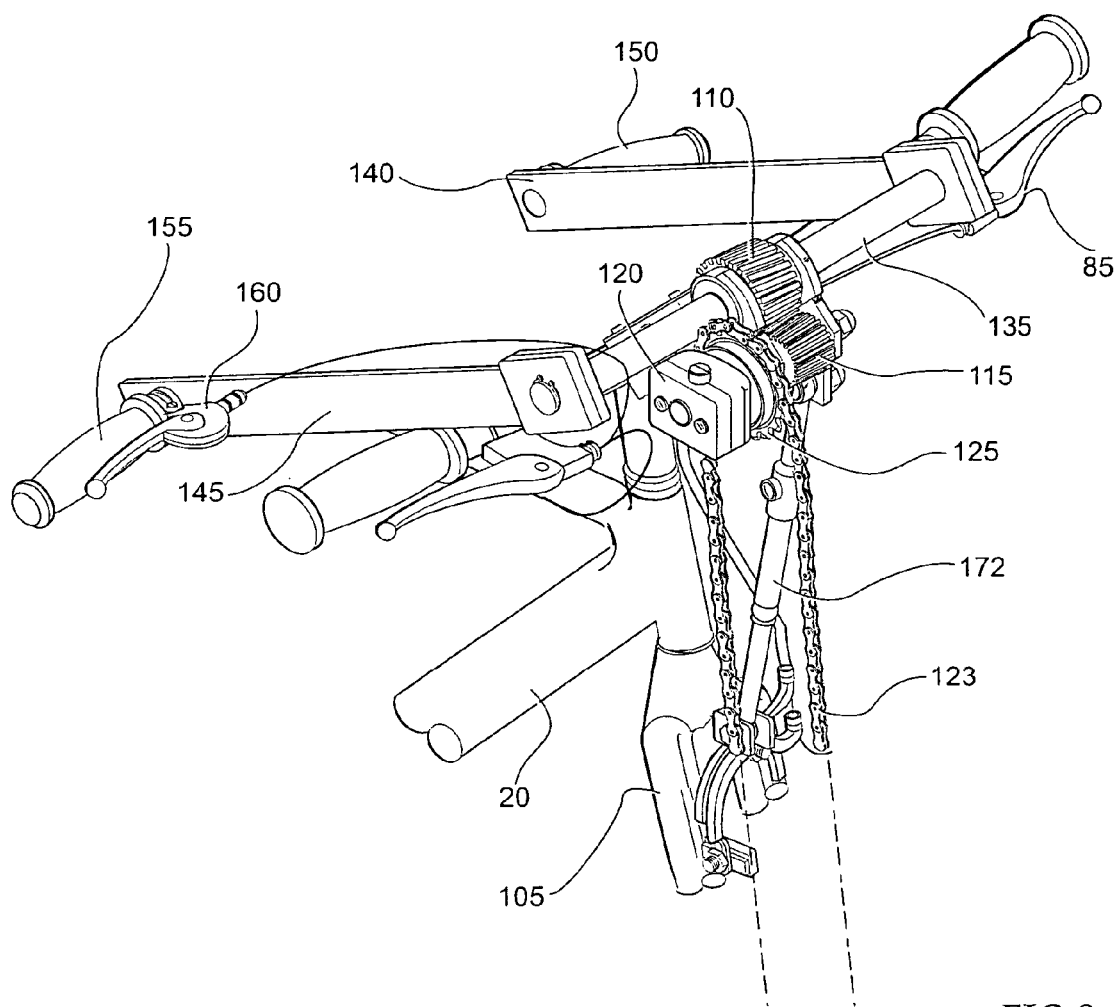
FIG. 8 is a more detailed view of the drive system of FIG. 4B in the downward position.

In a driving phase, the rider may push the handgrips downward until lever 145 reaches a down position, as indicated by the broken line depiction of this component. Similar to the embodiment of FIG. 4A, the driving phase operation of the embodiment of FIG. 4B causes a rotational force to be applied to wheel 55. FIG. 8 is a more detailed view of drive system 10 in the downward position.

After the driving phase, the rider may then pull the handgrips upward in a preparatory phase to ready the drive system for the next driving phase. Pulling the handgrips upward causes first gear 110 to rotate clockwise and second gear 115 to rotate counter clockwise. However, in this preparatory phase, freewheel 147 is disengaged with drive sprocket 125 such that the upward movement of the handgrips does not impart rotational forces on drive sprocket 125. As such, no rotational force is applied to driven sprocket 130 during this preparatory phase. A rider may repeatedly perform the driving and preparatory phases by repeatedly pushing downward and pulling upward handgrips 150,155. Such reciprocal motion applies a driving force to wheel 55, which may be used to supplement or replace user peddling.

If desired, freewheel 147 of drive system 10 may be implemented using a reversible freewheel, which is a type of freewheel that permits a user to selectively change direction of the driving force of the freewheel. For instance, embodiments of the invention have been described in which the driving phase is accomplished by moving handgrips 150, 155 rearward and/or downward. A reversible freewheel permits a user to selective change this direction such that the driving phase is accomplished by moving the handgrips forward and/or upward. In such an embodiment, the preparatory phase is accomplished by moving the handgrips rearward and/or downward.

Figure 9:
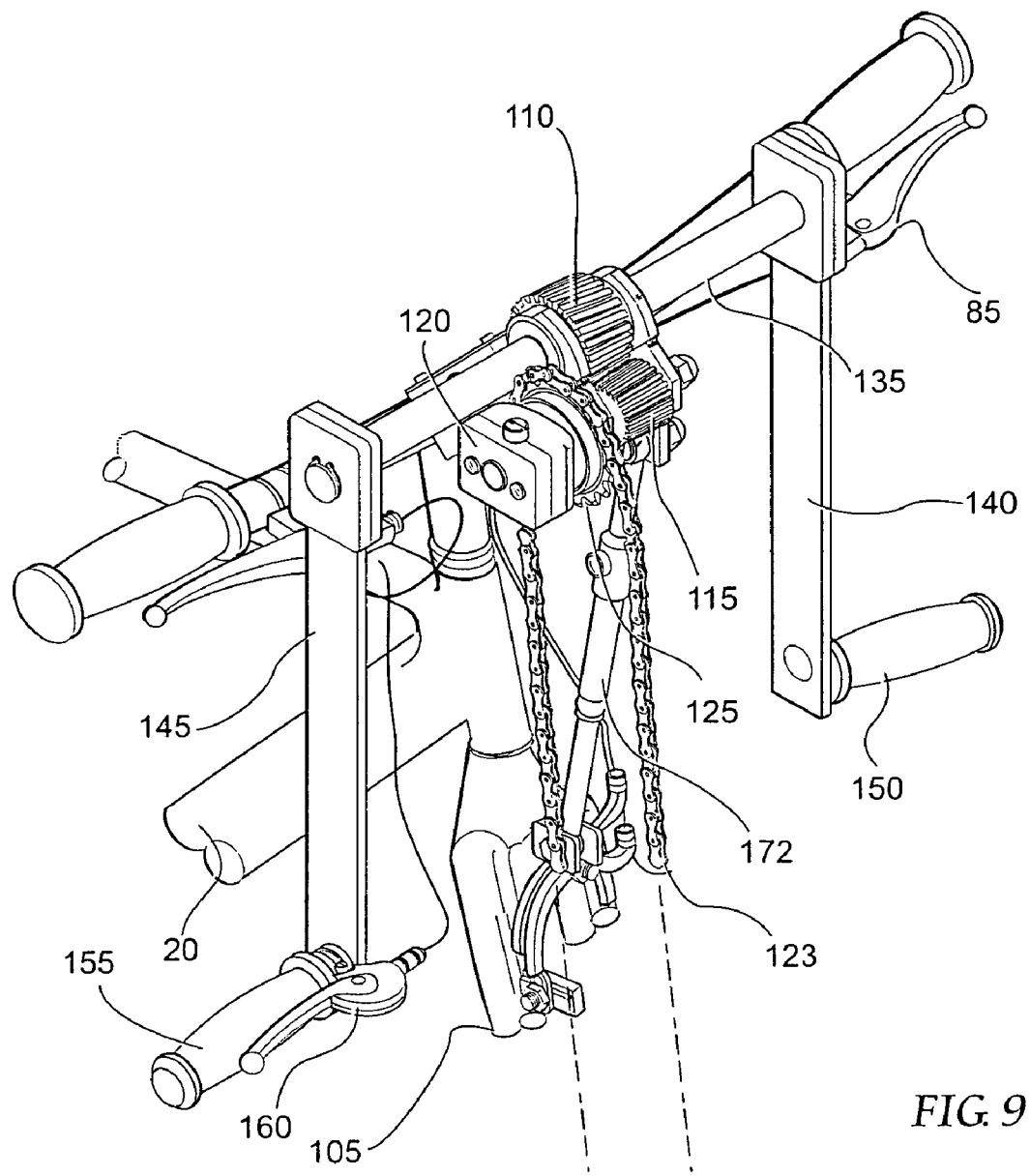
FIG. 9 is a detailed view of the drive system of FIG. 4B in the stowed position.

It is envisioned that a rider may not want to actively operate drive system 10 at various times while riding the bicycle. During such times, the drive system may be placed in the stowed position, such as that depicted in FIG. 9. This figure shows levers 140, 145 in a down position, facilitating easy access to handlebar 70.

Figure 10:
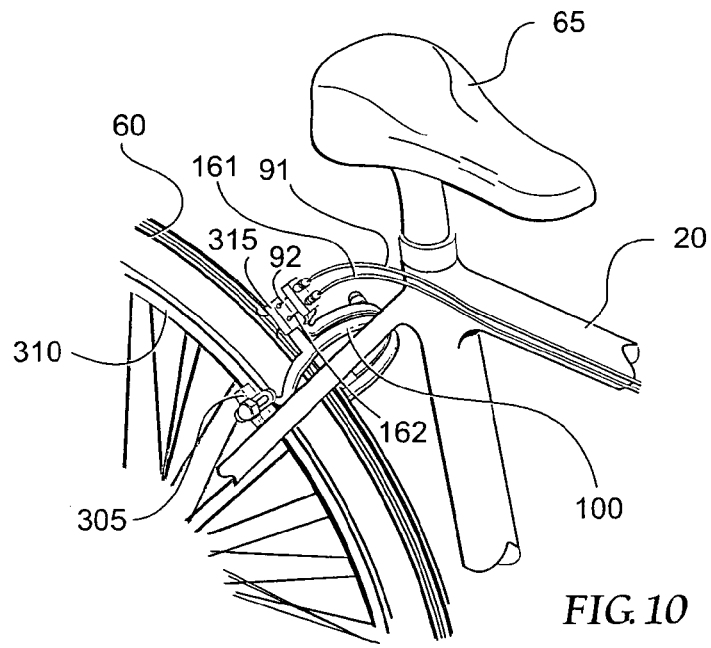
FIG. 10 is a perspective view of a rear brake assembly in accordance with an embodiment of the present invention.

FIG. 10 is a perspective view of a rear brake assembly in accordance with an embodiment of the present invention. The brake assembly includes side-pull brake 100, which has brake pads 305 located proximate to rim 310 of rear wheel 60. Cable enclosure 91 extends from rear brake lever 90 (FIG. 2), which is shown positioned on handlebar 70. Cable enclosure 161 extends from rear brake lever 160, which is shown positioned relative to handgrip 155. Cable 92 is carried within cable enclosure 91 and physically couples rear brake lever 90 and anchor block 315. Similarly, cable 162 is carried within cable enclosure 161 and physically couples rear brake lever 90 and anchor block 315.

Figures 11A, 11B:
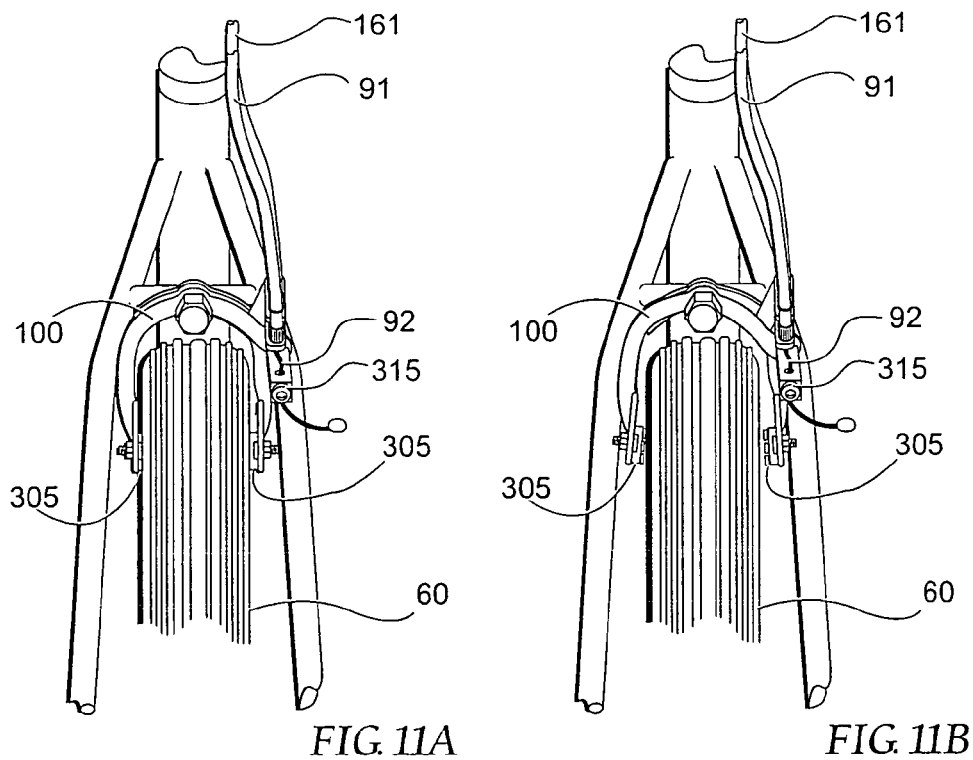
FIG. 11A is a rear view of the rear brake assembly of FIG. 10, showing brake pads in the closed position.
FIG. 11B is a rear view of the rear brake assembly of FIG. 10, showing brake pads in the open position.

To slow or stop the bicycle, a rider may apply a gripping force to either rear brake lever 90 or rear brake lever 160, which causes anchor block to move toward the exposed ends of cable enclosures 91 and 161. This action causes brake pads 305 to move inward, ultimately contacting rim 310 (FIG. 11A). Once the applied break lever has been released, the brake pads will move away from the rim and the rear wheel can once again freely rotate (FIG. 11B). The brake assembly of FIG. 10 has been described in conjunction with a side-pull brake assembly, but such teachings apply equally to other types of braking mechanisms such as, for example, center-pull brakes, cantilever brakes, and the like. In addition, such teachings may additionally or alternatively apply to braking mechanisms used for front wheels, or other wheels, of a cycle.

One advantage provided by the brake assembly of FIG. 10 is that a single brake assembly can be used to serve two (or more) separate brake levers. This is useful on cycles where the rider may place their hand at different locations during the duration of a ride, or on bicycles supporting multiple riders, each having a separate brake lever. Although the brake assembly of FIG. 10 has been described in conjunction with secondary rear brake lever 160 being located adjacent to a handgrip associated with drive system 10, this is not a requirement. The secondary rear brake lever may be implemented on other types of cycles, including those that do not implement drive system 10. One possible example is to position rear brake lever 160 on an aerodynamic bar, which is commonly affixed to the handlebars of bicycles.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims.

What is claimed is:

1. A drive system for use with a cycle having at least one wheel, said system comprising:
   a first gear structured to be rotatably driven in opposing first and second directions;
   a second gear structured to be rotatably driven responsive to said first gear and in a direction that is opposite to a direction that said first gear rotates;
   a freewheel operatively coupled to said second gear;
   a drive sprocket operatively coupled to said freewheel, wherein said freewheel causes said drive sprocket to be rotatably driven only when said first gear is rotatably driven in one of said first direction or said second direction;
   a driven sprocket for mounting coaxially and in driving relationship with a wheel;
   a link for linking said drive sprocket and said driven sprocket;
   a support bar coaxially mounted to said first gear and having spaced apart first and second locations; and
   first and second levers respectively extending from said first and second locations of said support bar, wherein reciprocal movement of said first and second levers causes said first gear to rotate in said first and second directions, and correspondingly causes said second gear to rotate, thereby effecting rotation in said drive sprocket and said driven sprocket.

2. The drive system according to claim 1, further comprising:
   a first handgrip extending from said first lever; and
   a second handgrip extending from said second lever.

3. The drive system according to claim 2, further comprising:
   a first brake lever proximately located relative to said first handgrip;
   a brake assembly structured to provide a stopping force to a wheel, said brake assembly comprising:
      an anchor block having an attached cable in communication with said first brake lever; and
      brake pads arranged relative to said wheel for providing said stopping force.

4. The drive system according to claim 2, further comprising:
   a first brake lever proximately located relative to said first handgrip;
   a second brake lever proximately located relative to a handlebar associated with said cycle;
   a brake assembly structured to provide a stopping force to a wheel, said brake assembly comprising:

an anchor block having a first attached cable in communication with said first brake lever, and a second attached cable in communication with said second brake lever; and brake pads arranged relative to said wheel for providing said stopping force.

5. The drive system according to claim 4, wherein said brake assembly is a side-pull brake assembly.

6. The drive system according to claim 1, further comprising:

a bracket for maintaining a relative spatial relationship of said first gear and said second gear; and a mounting bar having a first end for coupling to said bracket and a second end for coupling to a front fork of said cycle.

7. The drive system according to claim 6, wherein said mounting bar further comprises:

an adjustment device for adjusting the length of said mounting bar.

8. The drive system according to claim 1, wherein movement of said first and second levers in a rearward or downward direction relative to a user of said cycle causes said drive sprocket to be rotatably driven by said freewheel.

9. The drive system according to claim 1, wherein movement of said first and second levers in a forward or upward direction relative to a user of said cycle causes said drive sprocket to be rotatably driven by said freewheel.

10. The drive system according to claim 1, wherein said freewheel is a reversible freewheel that permits a change in direction that said drive sprocket is rotatably driven by said freewheel.

11. The drive system according to claim 1, wherein said link comprises a chain.

12. The drive system according to claim 1, wherein said link is selected from the group consisting of a chain, a belt, a strap, and a cable.

13. A cycle, comprising:

a frame operatively coupled with front and rear wheels;

a handlebar;

a drive system coupled to said handlebar, said drive system comprising:

a first gear structured to be rotatably driven in opposing first and second directions;

a second gear structured to be rotatably driven responsive to said first gear and in a direction that is opposite to a direction that said first gear rotates;

a freewheel operatively coupled to said second gear;

a drive sprocket operatively coupled to said freewheel, wherein said freewheel causes said drive sprocket to be rotatably driven only when said first gear is rotatably driven in one of said first direction or said second direction;

a driven sprocket for mounting coaxially and in driving relationship with a wheel;

a link for linking said drive sprocket and said driven sprocket;

a support bar coaxially mounted to said first gear and having spaced apart first and second locations; and first and second levers respectively extending from said first and second locations of said support bar, wherein reciprocal movement of said first and second levers causes said first gear to rotate in said first and second directions, and correspondingly causes said second gear to rotate, thereby effecting rotation in said drive sprocket and said driven sprocket.

14. The cycle according to claim 13, wherein said drive system further comprises:

a first handgrip extending from said first lever; and a second handgrip extending from said second lever.

15. The cycle according to claim 14, wherein said drive system further comprises:

a first brake lever proximately located relative to said first handgrip;

a brake assembly structured to provide a stopping force to a wheel, said brake assembly comprising:

an anchor block having an attached cable in communication with said first brake lever; and brake pads arranged relative to said wheel for providing said stopping force.

16. The cycle according to claim 14, wherein said drive system further comprises:

a first brake lever proximately located relative to said first handgrip;

a second brake lever proximately located relative to a handlebar associated with said cycle;

a brake assembly structured to provide a stopping force to a wheel, said brake assembly comprising:

an anchor block having a first attached cable in communication with said first brake lever, and a second attached cable in communication with said second brake lever; and brake pads arranged relative to said wheel for providing said stopping force.

17. The cycle according to claim 13, wherein said drive system further comprises:

a bracket for maintaining a relative spatial relationship of said first gear and said second gear; and a mounting bar having a first end for coupling to said bracket and a second end for coupling to a front fork of said cycle.

18. The cycle according to claim 17, wherein said mounting bar further comprises:

an adjustment device for adjusting the length of said mounting bar.

19. The cycle according to claim 13, wherein movement of said first and second levers in a rearward or downward direction relative to a user of said cycle causes said drive sprocket to be rotatably driven by said freewheel.

20. The cycle according to claim 13, wherein movement of said first and second levers in a forward or upward direction relative to a user of said cycle causes said drive sprocket to be rotatably driven by said freewheel.

21. The cycle according to claim 13, wherein said freewheel is a reversible freewheel that permits a change in direction that said drive sprocket is rotatably driven by said freewheel.

22. A drive system for use with a cycle, said system comprising:

a first gear structured to be rotatably driven in opposing first and second directions;

a second gear structured to be rotatably driven responsive to said first gear and in a direction that is opposite to a direction that said first gear rotates;

a freewheel operatively coupled to said second gear;

a drive sprocket operatively coupled to said freewheel, wherein said freewheel causes said drive sprocket to be rotatably driven only when said first gear is rotatably driven in one of said first direction or said second direction;

a driven sprocket for mounting coaxially and in driving relationship with a wheel;

means for linking said drive sprocket and said driven sprocket; and means for causing said first gear to rotate in said first and second directions, and correspondingly causing said second gear to rotate, thereby effecting rotation in said drive sprocket and said driven sprocket.

23. A method for driving a wheel of a cycle, comprising:

driving a first gear in opposing first and second directions;

causing a second gear to be rotatably driven responsive to said first gear and in a direction that is opposite to a direction that said first gear rotates;

causing rotation in a freewheel drive sprocket only when said first gear is rotatably driven in one of said first direction or said second direction; and imparting a driving force onto said wheel responsive to said rotation in said freewheel drive sprocket.

\* \* \* \* \*